INCREMENTAL TAPE DRIVE SYSTEM
Filed Sept. 14, 1964
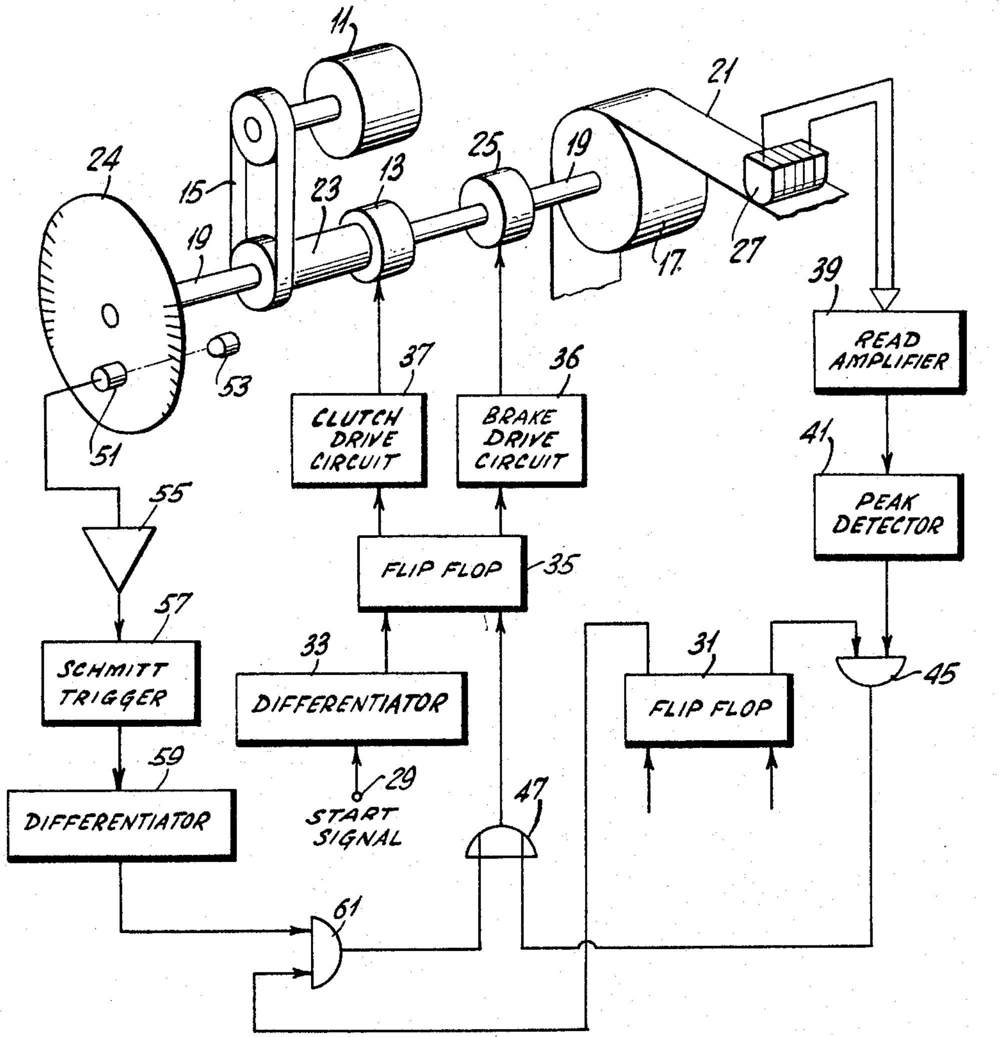
INVENTOR
ELEUTHERE POUMAKIS
BY
Douglas M. Clarkson
ATTORNEY United States Patent Office 3,275,208
Patented Sept. 27, 1966

3,275,208
INCREMENTAL TAPE DRIVE SYSTEM
Eleuthere Poumakis, East Islip, N.Y., assignor to Potter Instrument Company, Inc., Plainview, N.Y., a corporation of New York
Filed Sept. 14, 1964, Ser. No. 396,064
10 Claims. (Cl. 226—9)

This invention, generally, relates to magnetic information-storage tape drive systems and, more particularly, to a tape drive system for an incremental tape transport.

In contrast with conventional tape transports, which read out and record information while the tape runs continuously at a high speed, incremental tape transports reads out and record one character at a time, and the tape is stopped between characters. Because incremental tape transports start and stop between characters, they operate at much lower transfer rates than conventional tape transports, but they have an important advantage over conventional tape transports in that each character can be recorded on the tape or read out from the tape at any random selected time.

In a conventional tape transport the transfer of characters to or from the tape must be in synchronism with the tape movement. For this reason, incremental tape transports are referred to as "asynchronous" whereas conventional tape transports are referred to as "synchronous." Because incremental tape transports are asynchronous, the need for costly buffering is eliminated, the information processed does not have to be divided into blocks of limited length corresponding to the capacity of the buffer, and uninterrupted communication is permitted.

Uninterrupted communication can be obtained in a conventional tape transport only with an elaborate reflexing buffer.

The present invention provides a tape drive system for an incremental tape transport which is capable of operating at a rate of four hundred increments per second with increments of 0.005 inch. The system operates by means of a magnetic particle clutch and a magnetic particle brake. In response to an input pulse calling for an incremental step, the brake is deenergized and the clutch is energized, and a motor begins to drive the tape through the interconnecting clutch. The clutch then is automatically deenergized, and the brake is energized to stop the tape after it has travelled the desired incremental distance.

Because of the high stepping rate, a conventional clutch and brake cannot be used in the system, and instead, the magnetic particle clutch and the magnetic particle brake, which have a very fast response, are used.

The high stepping rate requires a high angular acceleration in the coupling or driving shaft, and this high angular acceleration results in a substantial amount of shaft windup and oscillation, which can cause substantial variation in the incremental distance that the tape is moved in each step. This variation is prevented in the system of the present invention by making the control of the stepping operation totally dependent upon position.

In accordance with a presently preferred form of the present invention, a flip-flop circuit is set in response to each applied pulse calling for an incremental step. In response to the flip-flop being set, the clutch is energized and the brake is deenergized, so that the capstan driving the tape begins to accelerate. Then, in response to the tape or capstan reaching a predetermined position, a pulse is generated to reset the flip-flop. In response to the flip-flop being reset, the clutch is deenergized and the brake is energized to stop the tape after it has been driven the desired incremental distance. With this position-dependent system, the incremental distance that the tape is moved on each step is maintained relatively constant.

Accordingly, an object of the present invention is to provide an improved incremental drive system for magnetic storage tape.

Another object of the present invention is to provide an incremental magnetic tape drive system which can operate at a high stepping rate.

A further object of the present invention is to provide an incremental magnetic tape drive system which steps at a high rate and in which the incremental distance through which the tape is stepped is maintained relatively constant.

Further objects and advantages of the present invention will become readily apparent when take in conjunction with the single figure of the drawings, which is a schematic illustration of the invention.

As shown in the drawings, a motor 11 continuously drives the input of a suitable electrically operated clutch 13 by means of a belt and pulley arrangement 15. The clutch 13, when energized, drives a capstan 17 by means of a shaft 19. The capstan 17, in turn, drives a magnetic storage tape 21.

The driving connection from the belt and pulley arrangement 15 to the input of the clutch 13 is made by means of hollow shaft 23 through which the shaft 19 passes. On the opposite end of the shaft 19 from the capstan 17, a photoelectric tone wheel 24 is mounted. Thus the tone wheel 24 is mechanically fixed to the capstan 17 and turns in synchronism with it.

When the clutch 13 is energized, it will couple the input of the clutch 13 to the shaft 19, and thus, the motor 11 will drive the capstan 17. A suitable electrically operated brake 25 surrounds the shaft 19, and when the brake 25 is energized, it will stop the shaft 19 quickly. Preferably, the clutch 13 and the brake 25 are of the magnetic particle types in which the input and output shafts are coaxial. Such a clutch and brake are disclosed in a patent issued to Louis G. Metzger, Patent No. 3,208,567 and assigned to the assignee of the present invention.

In operation, when it is desired for the magnetic tape 21 to move forward one incremental step, the brake 25 will be deenergized to release the shaft 19 and the clutch 13 will be energized, so that the motor 11 begins to drive the capstan 17 and the magnetic tape 21. Then, the clutch 13 will be deenergized automatically, and the brake 25 will be energized to bring the capstan 17 and the magnetic tape 21 quickly to a stop after the magnetic tape 21 has moved through the desired incremental distance.

The tape 21 is driven past a set of transducing heads 27 which record a character on the tape or read out a character from the tape each time the tape is moved through one incremental step.

The incremental movement of the tape is started in response to a pulse applied to an input terminal 29. When a character is being read out from the tape, the incremental movement is brought to a stop automatically, after the tape has moved the desired incremental distance, in response to a clock pulse which is produced by the set of transducing heads 27 each time a character is read out.

When information is recorded, the tape is stopped automatically after it has moved the desired incremental distance in response to a pulse produced by the tone wheel 24. A flip-flop circuit 31 provides the control for the different operation of the system during recording and reproducing. When information is to be read out, a signal is applied to the flip-flop 31 to set the flip-flop in its "zero" state, and when information is to be recorded, a signal is applied to the flip-flop 31 to set it in its "one" state.

When a pulse is applied to the input 29, it is first differentiated by a differentiator circuit 33 and, then, applied to a flip-flop circuit 35 to set the flip-flop 35 in its one state. The flip-flop 35 controls the energization of the clutch 13 and the brake 25. When the flip-flop 35 is in its zero state, it will apply an enabling signal to a brake drive circuit 36, and when the flip-flop 35 is in its one state, it will apply an enabling signal to a clutch drive circuit 37. When the brake drive circuit receives the enabling signal from the flip-flop 35, it will energize the brake 25 to brake the shaft 19. When the clutch drive circuit 37 receives the enabling signal from the flip-flop 35, it will energize the clutch 13 to couple the motor 11 to the shaft 19.

When the tape is not moving, the flip-flop 35 will be in its zero state so that the brake 25 is energized and the clutch 13 is deenergized. When the flip-flop 35 is set into its one state in response to the pulse applied to the input 29, the brake 25 will be deenergized, and the clutch drive circuit 37 will energize the clutch 13 to couple the output of the motor 11 to the shaft 19 so that the motor 11 begins driving the capstan 17 and the tape 21.

If characters are being read out from the tape, the transducers 27 will read out signals representing a character after the tape 21 has begun to move, and these signals will be amplified by a read amplifier circuit 39. Accompanying the signals representing a character will be a clock pulse signal, and the read amplifier 39, after amplifying this signal, applies it to a peak detector circuit 41. The peak detector 41 detects the peak of the applied clock pulse and applies a pulse at the time of the peak to a gate 45, which will be enabled by the flip-flop 31 when the flip-flop 31 is in its zero state. Thus during a read-out operation, the gate 45 will be enabled, and the pulse from the peak detector 41 will pass through the gate 45 and, then, through an OR gate 47 to set the flip-flop 35 back to its zero state.

When the flip-flop 35 is set back to its zero state, it will no longer apply an enabling signal to the clutch drive circuit 37, and accordingly, the clutch drive circuit 37 will deenergize the magnetic particle clutch 13. When the flip-flop 35 is in its zero state, it will enable the brake drive circuit 36 which, accordingly, will energize the magnetic particle brake 25 to stop the shaft 19 and the capstan 17 and also the tape 21. In this manner, the tape 21 is stopped automatically after a character is read out.

When characters are being recorded on the tape, the incremental movement of the tape 21 is started in the same manner in response to a pulse applied to the input 29 but is stopped in response to a pulse produced by the tone wheel 24. When a mark on the tone wheel 24 moves past the sensing position, a photocell 51, which is illuminated through the tone wheel 24 by means of a light source 53, will produce an output pulse. This output pulse is amplified by an amplifier circuit 55 and applied to a Schmitt trigger 57.

In response to receiving the pulse, the Schmitt trigger 57 produces an output pulse, which is applied to a differentiator circuit 59. The differentiator 59 differentiates the output pulse of the Schmitt trigger 57 and applies it to a gate 61. When the flip-flop 31 is in its one state, as it will be when a recording operation is being carried out, it will apply an enabling signal to the gate 61 so that the differentiated output of the Schmitt trigger 57 will pass through the gate 61.

The output of the differentiator 59 then passes through the OR gate 47 to set the flip-flop 35 back to its zero state. Accordingly, the brake drive circuit 36 will energize the magnetic particle brake 25, and the clutch drive circuit 37 will deenergize the clutch 13, so that the capstan 17 and the tape 21 are brought to a stop. The marks on the tone wheel 24 are spaced so that the distance that the tape travels in each incremental movement is the desired distance of 0.005 inch.

Thus, the stopping of the incremental movement during both recording and reproducing is dependent entirely upon position. In a reproducing operation, it is dependent upon the position of the tape, and in a recording operation, it is dependent upon the position of the tone wheel. Because of the fact that stopping the tape is dependent upon position, the incremental distance that the tape moves on each step is maintained relatively constant even though the stepping is carried out at the high stepping rate of 400 steps per second.

The above description is of a presently preferred embodiment of the invention, and many modifications may be made thereto without departing from the spirit and scope of the invention, which is limited only as defined in the appended claims.

What is claimed is:

1. An incremental magnetic storage tape drive system comprising,
 a capstan for driving a magnetic storage tape,
 a motor,
 a clutch operable when energized to couple the output of said motor to drive said capstan,
 a brake operable when energized to brake said capstan,
 bi-stable means having a first stable state and a second stable state,
 means operable to energize said clutch only when said bi-stable means is in said first stable state,
 means operable to energize said brake only when said bi-stable means is in said second stable state,
 means selectively operable to set said bi-stable means in said first stable state, and
 means responsive to the movement of said capstan to a predetermined position to set said bi-stable means to said second stable state.

2. An incremental magnetic storage tape drive system comprising,
 a capstan for driving magnetic storage tape,
 a motor,
 a magnetic particle clutch operable when energized to couple the output of said motor to drive said capstan,
 a magnetic particle brake operable when energized to brake said capstan,
 bi-stable means having a first stable state and a second stable state,
 means operable to energize said clutch only when said bi-stable means is in said first stable state,
 means operable to energize said brake only when said bi-stable means is in said second stable state,
 means selectively operable to set said bi-stable means in said first stable state, and
 means responsive to the movement of said capstan to a predetermined position to set said bi-stable means to said second stable state.

3. An incremental magnetic storage tape drive system comprising,
 a capstan for driving magnetic storage tape,
 a motor,
 a clutch operable when energized to couple the output of said motor to drive said capstan,
 a brake operable when energized to brake said capstan,
 a tone wheel fixed to turn with said capstan and operable to produce output pulses as said capstan turns through predetermined angular positions, and
 means selectively operable to energize said clutch and deenergize said brake and then to automatically deenergize said clutch and energize said brake in response to the first pulse produced by said tone wheel after said clutch is energized.

4. An incremental magnetic storage tape drive system comprising,
 a capstan for driving magnetic storage tape,
 a motor,
 a magnetic particle clutch operable when energized to couple the output of said motor to drive said capstan,
 a magnetic particle brake operable when energized to brake said capstan, a tone wheel fixed to turn with said capstan and operable to produce pulses as said capstan turns through predetermined angular positions, and means selectively operable to energize said clutch and deenergize said brake and then to automatically deenergize said clutch and energize said brake in response to the first pulse produced by said tone wheel after said clutch is energized.

5. An incremental magnetic storage tape drive system comprising, a capstan for driving magnetic storage tape, a motor, a clutch operable when energized to couple the output of said motor to drive said capstan, a brake operable when energized to brake said capstan, bi-stable means having a first stable state and a second stable state, a tone wheel fixed to turn with said capstan and operable to produce output pulses as said capstan turns through predetermined angular positions, means operable to energize said clutch only when said bi-stable means is in said first stable state, means operable to energize said brake only when said bi-stable means is in said second stable state, means selectively operable to set said bi-stable means in said first stable state, and means operable to set said bi-stable means in said second stable state in response to the first pulse produced by said tone wheel after said clutch is energized.

6. An incremental magnetic storage tape drive system comprising, a capstan for driving magnetic storage tape, a motor, a magnetic particle clutch operable when energized to couple the output of said motor to drive said capstan, a magnetic particle brake operable when energized to brake said capstan, a tone wheel fixed to turn with said capstan and operable to produce output pulses as said capstan turns through predetermined angular positions, bi-stable means having a first stable state and a second stable state, means operable to energize said clutch only when said bi-stable means is in said first stable state, means operable to energize said brake only when said bi-stable means is in said second stable state, means selectively operable to set said bi-stable means in said first stable state, and means to set said bi-stable means in said second stable state responsive to the first output pulse produced by said tone wheel after said clutch is energized.

7. An incremental tape drive system comprising, a magnetic storage tape, a capstan operable to drive said magnetic storage tape, a motor, a clutch operable when energized to couple the output of said motor to drive said capstan, a brake operable when energized to stop said capstan, bi-stable means having a first stable state and a second stable state, means operable to energize said clutch only when said bi-stable means is in said first stable state, means operable to energize said brake only when said bi-stable means is in said second stable state, means selectively operable to set said bi-stable means in said first stable state, and means responsive to the movement of said capstan to a predetermined position to set said bi-stable means in said second stable state.

8. An incremental tape drive system comprising, a magnetic storage tape, a capstan operable to drive said magnetic storage tape, a motor, a clutch operable when energized to couple the output of said motor to drive said capstan, a brake operable when energized to brake said capstan, a tone wheel fixed to turn with said capstan and operable to produce output pulses as said capstan turns through predetermined angular positions, and means selectively operable to energize said clutch and to deenergize said brake and then to automatically deenergize said clutch and to energize said brake in response to the first output pulse produced by said tone wheel after said clutch is energized.

9. An incremental magnetic storage tape drive system comprising, a rotatable capstan for driving a magnetic storage tape, means for sensing information stored on said tape, a motor, a clutch operable when engaged to couple the output of said motor to rotate said capstan, a brake operable when engaged to brake said capstan, means for producing a start signal to start rotation of said capstan, first means including said sensing means for producing a stop signal to stop rotation of said capstan, second means responsive to the angular position of the capstan for generating a stop signal to stop rotation of said capstan, means responsive to said start signal to engage said clutch and disengage said brake, means responsive to said stop signal to engage said brake and disengage said clutch, means for coupling said start signal responsive means to said start signal producing means, and means for selectively coupling said stop signal responsive means to said first stop signal producing means when sensing information on said tape and means to said second stop signal producing means when recording information on said tape.

10. An incremental magnetic storage tape drive system as in claim 9 wherein said means responsive to the angular position of the capstan includes a tone wheel affixed to turn with said capstan and operable to produce output pulses as said capstan turns through predetermined angular positions.

References Cited by the Examiner

UNITED STATES PATENTS

| | | | |
|---|---|---|---|
| 2,886,398 | 5/1959 | Rockwell. | |
| 3,069,666 | 12/1962 | Austin | 179—100.2 X |
| 3,094,261 | 6/1963 | Thompson | 226—9 |
| 3,208,567 | 9/1965 | Metzger | 192—51 X |

M. HENSON WOOD, Jr., *Primary Examiner.*

J. E. ERLICH, *Assistant Examiner.*